United States Patent
Al Sakka et al.

(10) Patent No.: US 12,533,923 B2
(45) Date of Patent: Jan. 27, 2026

(54) TORQUE CONTROL FOR HYDRAULIC PUMPS IN HYDRAULIC SUSPENSION SYSTEMS

(71) Applicant: Advanced Suspension Technology LLC, Northville, MI (US)

(72) Inventors: Monzer Al Sakka, Sint-Truiden (BE); Kylian Praet, Antwerp (BE); Sebastiaan Van Aalst, St. Truiden (BE)

(73) Assignee: Advanced Suspension Technology LLC, Northville, MI (US)

(*) Notice: Subject to any disclaimer, the term of this patent is extended or adjusted under 35 U.S.C. 154(b) by 85 days.

(21) Appl. No.: 18/591,156

(22) Filed: Feb. 29, 2024

(65) Prior Publication Data

US 2025/0276553 A1    Sep. 4, 2025

(51) Int. Cl.
    *B60G 17/018*    (2006.01)

(52) U.S. Cl.
    CPC ...... *B60G 17/018* (2013.01); *B60G 2202/416* (2013.01); *B60G 2400/60* (2013.01); *B60G 2500/104* (2013.01); *B60G 2600/70* (2013.01); *B60G 2800/012* (2013.01); *B60G 2800/014* (2013.01)

(58) Field of Classification Search
    CPC ............ B60G 17/018; B60G 2202/416; B60G 2400/60; B60G 2500/104; B60G 2600/70; B60G 2800/012; B60G 2800/014
    See application file for complete search history.

(56) References Cited

U.S. PATENT DOCUMENTS

| | | | |
|---|---|---|---|
| 8,776,961 B2 | 7/2014 | Mori et al. | |
| 11,021,033 B2* | 6/2021 | Anderson | B60G 17/019 |
| 2012/0305347 A1* | 12/2012 | Mori | B60G 17/08 188/266.2 |
| 2014/0297117 A1* | 10/2014 | Near | H02K 29/08 701/37 |

(Continued)

FOREIGN PATENT DOCUMENTS

| | | |
|---|---|---|
| JP | 2015147502 A | 8/2015 |
| KR | 20180038277 A | 4/2018 |

(Continued)

*Primary Examiner* — Phutthiwat Wongwian
*Assistant Examiner* — Susan E Scharpf
(74) *Attorney, Agent, or Firm* — Harness, Dickey & Pierce, P.L.C.

(57) ABSTRACT

A suspension system and method of controlling the same is provided. The suspension system includes a damper and a pump assembly fluidly connected with the damper, the pump assembly having a pump and a pump motor. The method includes: (i) monitoring real-time data reflecting at least one of a dynamic state of the vehicle and an input from a vehicle operator; (ii) calculating a damper force based on the real-time data, the damper force being a force to be output by the damper; (iii) determining a hydraulic torque to be output by the pump based on the calculated damper force; (iv) determining a current to be applied to the pump motor based on the determined hydraulic torque; (v) applying the determined current to the pump motor to operate the pump; and (vi) applying a force to the vehicle by the damper.

16 Claims, 5 Drawing Sheets

(56) References Cited

U.S. PATENT DOCUMENTS

| | | | | |
|---|---|---|---|---|
| 2015/0224845 A1* | 8/2015 | Anderson | ............... | F03G 7/081 |
| | | | | 701/37 |
| 2017/0137023 A1* | 5/2017 | Anderson | ............. | B60W 50/14 |
| 2017/0240017 A1* | 8/2017 | Vandersmissen | ...... | B60G 17/06 |
| 2021/0339595 A1* | 11/2021 | Anderson | ............ | B60G 17/019 |
| 2022/0144035 A1* | 5/2022 | Al Sakka | ............... | B60G 21/10 |

FOREIGN PATENT DOCUMENTS

| | | |
|---|---|---|
| KR | 20180038282 | 4/2018 |
| KR | 20180038282 A | 4/2018 |

* cited by examiner

TORQUE CONTROL FOR HYDRAULIC PUMPS IN HYDRAULIC SUSPENSION SYSTEMS

FIELD

The present disclosure relates generally to suspension systems for motor vehicles and more particularly to suspension systems and associated control methods that resist the pitch and roll movements of a vehicle by controlling the hydraulic torque output by a pump fluidly connected to a damper.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during cornering (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the vehicle operator and/or passengers.

Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning). Such mechanical systems cannot be easily switched off or cancelled out when roll stiffness is not needed. Some vehicles do have stabilizer bar/anti-roll bar disconnects that may be manually or electronically actuated, but the complexity and costs associated with these systems make them ill-suited for most vehicle applications. Packaging constraints also limit the ability to provide mechanical systems that effectively limit fore and aft pitch.

In an effort to augment or replace traditional mechanical stabilizer bars/anti-roll bars, anti-roll suspension systems are being developed that include one or more dampers that be independently actuated via one or more fluidly-connected pumps, wherein the pump(s) can produce a pressure change in the damper(s). In some suspension systems, there is one pump per damper, whereas in other suspension systems, there is one pump per two or more dampers. Additionally, other anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. The pressure changes in the damper(s) increases the roll and pitch stiffness of the suspension system of the vehicle. As stated herein these suspension systems use pumps to generate the pressure changes in the dampers and the active forces exerted by the dampers. The flow or the speed of the pump is controlled to generate a requested pressure which is translated to a force by the damper. In many current suspension systems, this way of controlling the pump requires the measurements of the pressures in the suspension system using one or more pressure sensors. The control system is sensitive to disturbance of the pressure signals from the one or more pressure sensors due to noise or road inputs. As a result, the comfort and performance of the suspension system is deteriorated.

Accordingly, there is a need for a suspension system that can produce target forces from the one or more dampers without relying on pressure signals from one or more pressure sensors.

SUMMARY

This section provides a general summary of the disclosure, and is not a comprehensive disclosure of its full scope or all of its features.

In accordance with one aspect of the subject disclosure, a suspension system for a vehicle is provided. The suspension system for a vehicle includes a damper, a pump fluidly connected to the damper, a pump motor connected to the pump and configured to operate the pump in either a first, forward direction or a second, reverse direction, one or more sensors on-board the vehicle, the one or more onboard sensors configured to generate real-time vehicle data, such as for example dynamic vehicle state data and vehicle operator input data, and a suspension control unit operatively connected to the pump motor and the one or more onboard sensors. The one or more onboard sensors may include, but are not limited to, a steering wheel angle (SWA) sensor, a throttle position sensor, a brake position sensor, a vehicle speed sensor, one or more wheel speed sensors, and an inertial measurement unit (IMU). The suspension control unit is configured to receive data from the one or more onboard sensors and is configured to control the electric torque of the pump motor in response to the data received from the one or more onboard sensors. For example, the electric torque of the pump motor is controlled rather than fluid flow rate through the pump or the speed (RPM) of the pump motor. Therefore, pressure measurements of the suspension system are not needed for the control of the forces from the damper and the control of the suspension system is less sensitive to disturbance due to noise and/or road inputs. The electric torque of the pump motor has a defined relationship with the hydraulic torque of the pump. The hydraulic torque is the pressure difference between a first port and a second port of the pump. For example, in response to the real-time data received by the suspension control unit from at least one onboard sensor, the suspension control unit is configured to calculate a damper force based on the real-time data, the damper force being a force to be output by the damper, determine a hydraulic torque to be output by the pump based on the calculated damper force, determine a current to be applied to the pump motor based on the determined hydraulic torque, and cause the determined current to be applied the pump motor to operate the pump motor in the first direction or the second direction to cause the pump to pump hydraulic fluid into and/or out of the damper, to apply a force to the vehicle by the damper. In this way, the pump will absorb disturbances due to road inputs, improving comfort over suspension systems utilizing one or more pressure sensors for control.

In some aspects of the subject disclosure, a method of controlling a suspension system of a vehicle is provided. The suspension system includes a damper and a pump assembly fluidly connected with the damper, the pump assembly having a pump and a pump motor. The method includes: (i) monitoring real-time data from at least one onboard sensor, the real-time data reflecting at least one of a dynamic state of the vehicle and an input from a vehicle operator; (ii) calculating a damper force based on the real-time data, the damper force being a force to be output by the damper; (iii) determining a hydraulic torque to be output by the pump based on the calculated damper force; (iv) determining a current to be applied to the pump motor based on the determined hydraulic torque; (v) applying the determined current to the pump motor to operate the pump motor in a first direction or a second direction to cause the pump to pump hydraulic fluid into and/or out of the damper; and (vi) applying a force to the vehicle by the damper.

In accordance with one aspect of the subject disclosure, a method of controlling a suspension system of a vehicle is provided. The suspension system includes a first damper, a second damper, and a pump assembly fluidly connected with the first damper and the second damper, the pump assembly having a pump and a pump motor. The method includes: (i) monitoring real-time data from at least one onboard sensor, the real-time data reflecting at least one of a dynamic state of the vehicle and an input from a vehicle operator; (ii) calculating a moment compensation based on the real-time data, the moment compensation being a moment to be imparted on the vehicle by the first damper and the second damper; (iii) determining a hydraulic torque to be output by the pump based on the calculated moment compensation; (iv) determining a current to be applied to the pump motor based on the determined hydraulic torque; (v) applying the determined current to the pump motor to operate the pump motor in a first direction or a second direction to cause the pump to pump hydraulic fluid into and/or out of the first damper and into and/or out of the second damper; and (vi) applying a moment to the vehicle by the first damper and the second damper.

In accordance with another aspect of the subject disclosure, a suspension system of a vehicle is provided. The suspension system includes a damper, a pump assembly fluidly connected with the damper, the pump assembly having a pump and a pump motor, at least one onboard sensor configured to generate real-time data regarding the vehicle, and a suspension control unit operatively connected with the pump motor and the at least one onboard sensor. The suspension control unit includes a processor and memory configured to monitor the real-time data generated by said at least one onboard sensor. The suspension control unit is programmed to: (i) monitor real-time data from the least one onboard sensor, the real-time data reflecting at least one of a dynamic state of the vehicle and an input from a vehicle operator; (ii) calculate a damper force based on the real-time data, the damper force being a force to be output by the damper; (iii) determine a hydraulic torque to be output by the pump based on the calculated damper force; (iv) determine a current to be applied to the pump motor based on the determined hydraulic torque; and (v) cause the application of the determined current to the pump motor to operate the pump motor in a first direction or a second direction to cause the pump to pump hydraulic fluid into and/or out of the damper, to apply a force to the vehicle by the damper.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
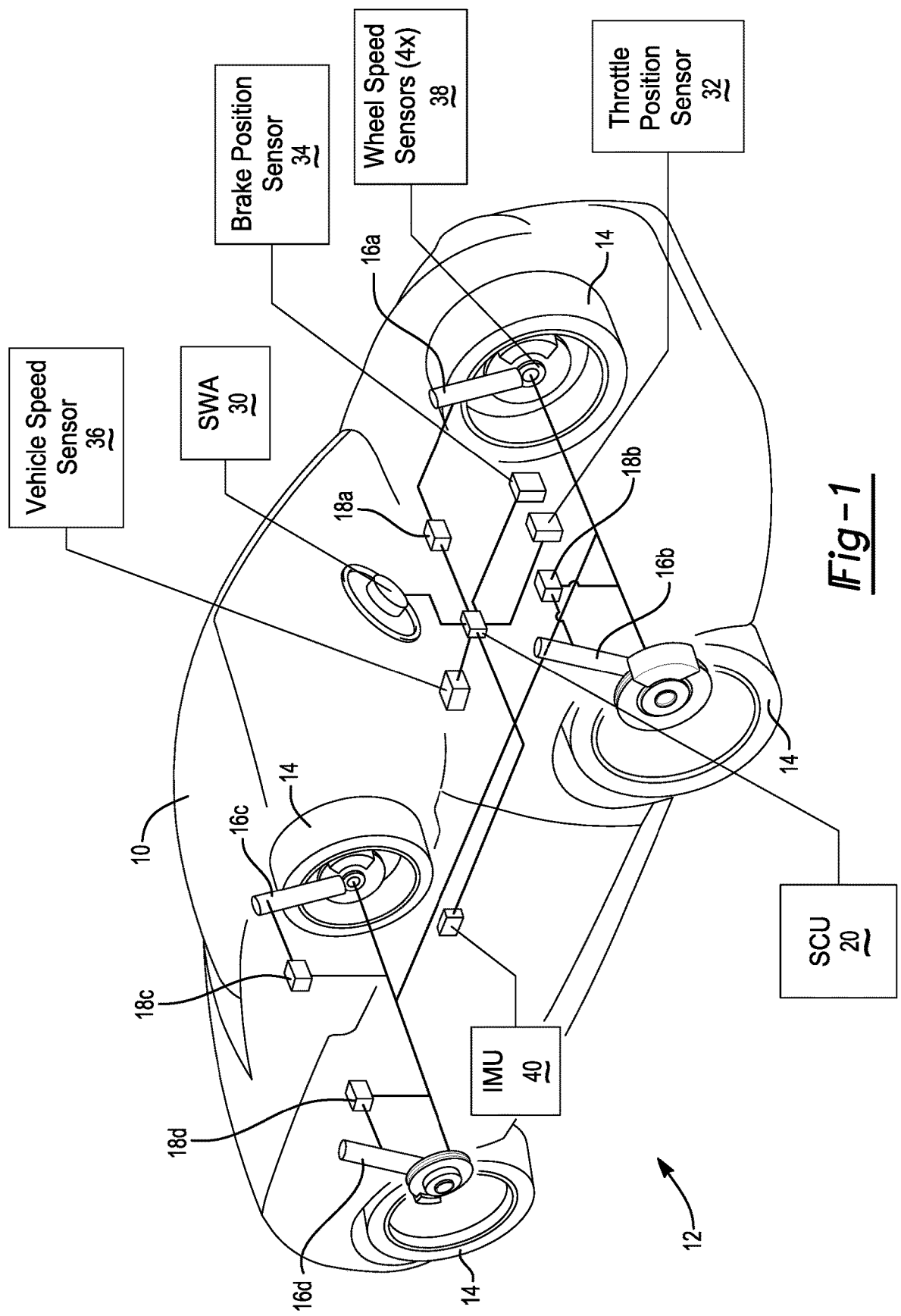
FIG. 1 is an illustration of an exemplary vehicle equipped with a suspension system in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exemplary vehicle 10 is illustrated that has been equipped with a suspension system 12 of the present disclosure. The vehicle 10 in FIG. 1 has been illustrated as an automobile; however, it should be appreciated that the suspension system 12 described herein is not limited to automobiles and may be used in other types of vehicles. In the illustrated example, the vehicle 10 has four wheels 14; however, it should be appreciated that the vehicle 10 may have fewer or greater than four wheels. Similarly, the suspension system 12 of the vehicle 10 includes a plurality of dampers 16a-16d, with one damper 16a-16d per wheel 14, including a front left damper 16a, a front right damper 16b, a back left damper 16c, and a back right damper 16d. While it should be appreciated that the suspension system 12 described herein may include a different number of dampers than those shown in the drawings, in most automotive applications, four dampers are used at each corner of a vehicle to control vertical movements of the front and rear wheels of the vehicle. Thus, the front left damper 16a controls (e.g., dampens) up and down (i.e., vertical) movements of the front left wheel 14 of the vehicle 10, the front right damper 16b controls (e.g., dampens) up and down (i.e., vertical) movements of the front right wheel 14 of the vehicle, the back left damper 16c controls (e.g., dampens) up and down (i.e., vertical) movements of the back left wheel of the vehicle 10, and the back right damper 16d controls (e.g., dampens) up and down (i.e., vertical) movements of the back right wheel of the vehicle 10. The dampers 16a, 16b, 16c, 16d may also be referred to as actuators.

The suspension system 12 of the vehicle 10 also includes a plurality of pump assemblies 18a-18d, with one pump assembly 18a-18d per damper 16a-16d, including a front left pump assembly 18a, a front right pump assembly 18b, a back left pump assembly 18c, and a back right pump assembly 18d. Although the suspension system 12 in FIG. 1 is shown having four pump assemblies, it should be appreciated that in some embodiments, the suspension system 12 may include two pump assemblies 18, comprising a front pump assembly 18 fluidly connected to the front left damper 16a and the front right damper 16b and a back pump assembly 18 fluidly connected to the back left damper 16c and the back right damper 16d. In other embodiments, the suspension system 12 may include two pump assemblies, comprising a first pump assembly 18 fluidly connected to the front left damper 16a and back right damper 16d and a back pump assembly 18 fluidly connected to the front right damper 16b and the back left damper 16c. In yet other embodiments, the suspension system 12 may include a single pump assembly 18 fluidly connected to the front left damper 16a, the front right damper 16b, the back left damper 16c, and the back right damper 16d.

The anti-roll, anti-pitch, and anti-heave capabilities of the suspension system 12 will be explained in greater detail below; however, from FIG. 1 it should be appreciated that fluid pressure in the dampers 16a, 16b, 16c, 16d can be dynamically adjusted to dynamically adjust the roll stiffness of the vehicle 10 and can be used to either augment or completely replace mechanical stabilizer bars/anti-roll bars. Such mechanical systems require relatively straight, unobstructed runs between each of the front dampers 16a, 16b and each of the back dampers 16c, 16d. Accordingly, the suspension system 12 disclosed herein offers packaging benefits because the dampers 16a, 16b, 16c, 16d do not need to be mechanically connected. The suspension system 12 may also be referred to as an active suspension system.

In the illustrated embodiment, the dampers 16a, 16b, 16c, 16d are identical; however, other configurations are possible where the front dampers 16a, 16b differ from the rear dampers 16c, 16d.

The suspension system 12 also includes a suspension control unit (SCU) 20 that includes one or more processors or controllers configured to execute computer programs to control the suspension system 12 by implementing the control methods described below and memory that is programmed with the aforementioned computer programs and control methods.

Figure 2:
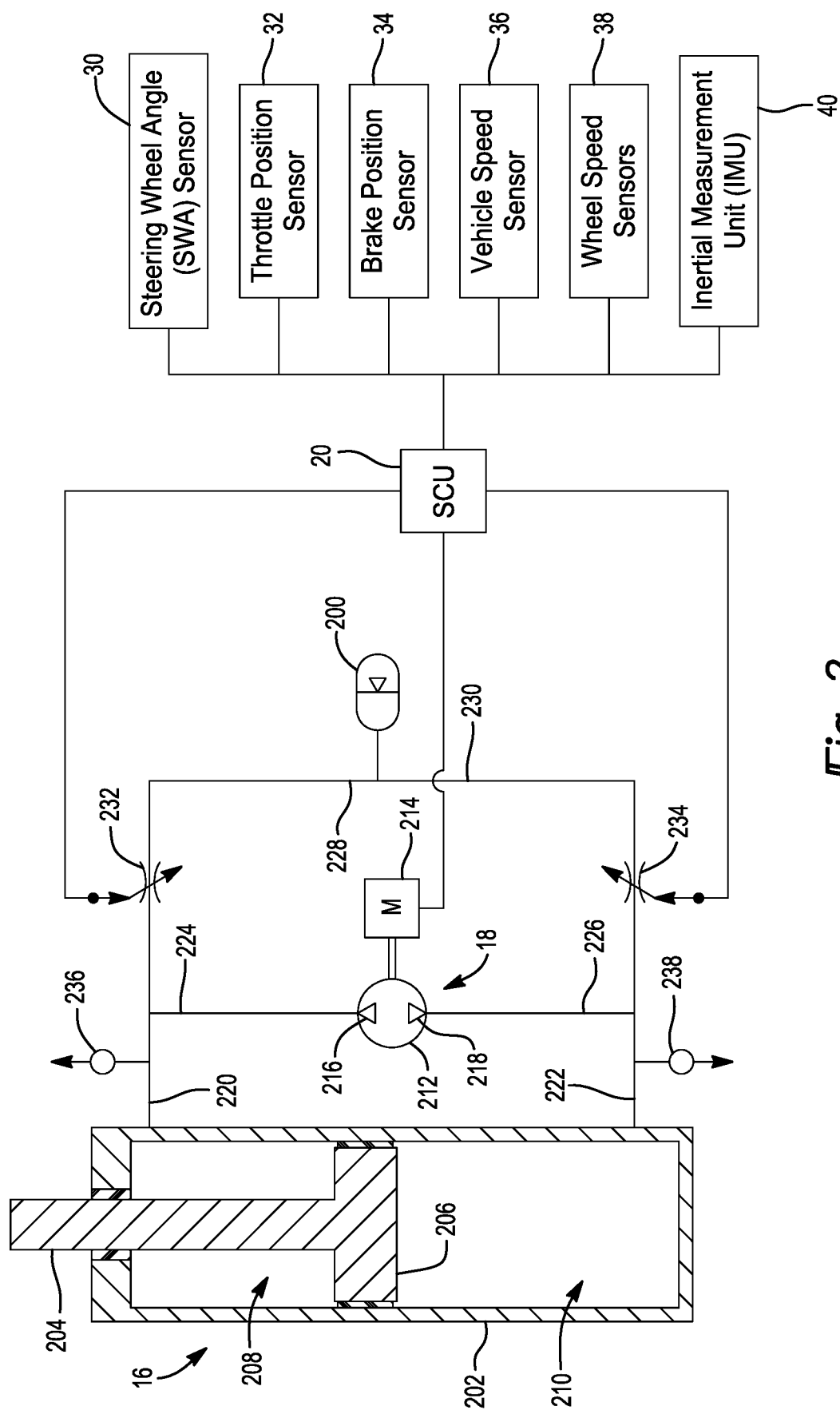
FIG. 2 is a schematic diagram illustrating a portion of the suspension system in accordance with the teachings of the present disclosure.

The suspension system 12 includes one or more sensors on-board the vehicle 12 (the sensors referred to as onboard sensors) that are configured to generate real-time vehicle data, such as for example dynamic vehicle state data and vehicle operator input data. It should be understood that the vehicle operator includes a human driver and/or an electronic vehicle control system. For example, the vehicle 10 may be operated by a human driver. In some embodiments, the electronic vehicle control system is configured to operate the vehicle 10 autonomously or semi-autonomously. The one or more onboard sensors are configured to provide the generated real-time vehicle data to the suspension control unit (SCU) 20. For example, the onboard sensor(s) of the suspension system 12 may include, but are not limited to, a steering wheel angle (SWA) sensor 30, a throttle position sensor 32, a brake position sensor 34, a vehicle speed sensor 36, one or more wheel speed sensors 38 positioned at each wheel 14 of the vehicle 10, and an inertial measurement unit (IMU) 40. In some embodiments, for example, if the vehicle 10 is an autonomous vehicle and does not include a steering wheel, the steering wheel angle (SWA) sensor 30 may be replaced with a sensor configured to determine the angle of one or more of the wheels 14 with respect to the body of the vehicle 10. It should be understood that the onboard sensors shown in FIGS. 1 and 2 are exemplary and onboard sensors other than and/or in addition to those shown and described may be included without departing from the scope of the disclosure.

The inertial measurement unit (IMU) 40 is configured to provide sprung mass acceleration data to the suspension control unit (SCU) 20. As such, the inertial measurement unit (IMU) 40 may include one or more accelerometers that are mounted to the vehicle body for measuring linear and/or longitudinal accelerations of the sprung mass of the vehicle 10 and one or more gyroscopes or magnetometers for providing tilt (i.e., pitch and roll angle) measurements, yaw rates, and heading references. The inertial measurement unit (IMU) 40 generates a lateral acceleration signal and a longitudinal acceleration signal that are indicative of the lateral and longitudinal accelerations of the vehicle 10. The lateral acceleration signal and the longitudinal acceleration signal are sent or relayed to the suspension control unit (SCU) 40 for processing in accordance with the control methods described below. In some embodiments, for example, the inertial measurement unit (IMU) 40 is configured to measure the vehicle speed, and thus the vehicle speed sensor 36 may not be included.

The steering wheel angle (SWA) sensor 30, the throttle position sensor 32, and the brake position sensor 34 may be generally referred to as vehicle operator input sensors. The vehicle speed sensor 36, the one or more wheel speed sensors 38, and the inertial measurement unit (IMU) 40 may be generally referred to as dynamic vehicle state sensors.

As shown in FIG. 1, the suspension control unit 20 is operatively connected to the pump assemblies 18a, 18b, 18c, 18d, the steering wheel angle (SWA) sensor 30, the throttle position sensor 32, the brake position sensor 34, the wheel speed sensor(s) 38, and the inertial measurement unit (IMU) 40. In some embodiments, the suspension control unit (SCU) 20 is also operatively connected to the dampers 16a, 16b, 16c, 16d. The operative connections are electrical connections (e.g., electric wiring); however, it should be appreciated that the electronic/electrical connections described herein are not necessarily limited to wired connections, as wireless connections between various components can also be used.

With reference to FIG. 2, additional details of the suspension system 12 are described with respect to a single damper 16 and a single pump assembly 18; however, it should be understood that the description with respect to the single damper 16 applies to the dampers 16a, 16b, 16c, 16d, and the description with respect to the single pump assembly 18 applies to the pump assemblies 18a, 18b, 18c, 18d. The damper 16 is fluidly connected to the pump assembly 18 and a hydraulic fluid accumulator 200. The damper 16 includes a damper housing 202, a piston rod 204, and a piston 206 that is mounted on the piston rod 204. The piston 206 is arranged in sliding engagement with the inside of the damper housing 202 such that the piston 206 divides the damper housing 202 into a first working chamber 208 and a second working chamber 210.

The pump assembly 18a includes a pump 212 and a pump motor 214. The pump 212 has a first pump port 216 and a second pump port 218. The pump 212 is a bi-directional pump driven by the pump motor 214.

The suspension system 12 further includes a plurality of hydraulic lines 220, 222, 224, 226, 228, and 230 fluidly connecting the pump 212, the hydraulic fluid accumulator 200, the first working chamber 208, and the second working chamber 210. For example, the first pump port 216 is fluidly connected to the first working chamber 208 of the damper 16 by the first hydraulic line 220 and the third hydraulic line 224, and the second pump port 218 is fluidly connected to the second working chamber 210 of the damper 16 by the second hydraulic line 222 and the fourth hydraulic line 226. The first hydraulic line 220 and the third hydraulic line 224 are fluidly connected to one another. The second hydraulic line 222 and the fourth hydraulic line 226 are fluidly connected to one another. Although the first hydraulic line 220 and the third hydraulic line 224 are referenced as two hydraulic lines, it will be understood that in some embodiments, the first hydraulic line 220 and the third hydraulic line 224 are a single hydraulic line. Additionally, although the second hydraulic line 222 and the fourth hydraulic line 226 are referenced as two hydraulic lines, it will be understood that in some embodiments, the second hydraulic line 222 and the fourth hydraulic line 226 are a single hydraulic line.

Additionally, the first working chamber 208, the first pump port 216, and the hydraulic fluid accumulator 200 are fluidly connected to one another by the first hydraulic line 220, the third hydraulic line 224, and the fifth hydraulic line 228. The second working chamber 210, the second pump port 218, and the hydraulic fluid accumulator 200 are fluidly connected to one another by the second hydraulic line 222, the fourth hydraulic line 226, and the sixth hydraulic line 230. It should be appreciated that the hydraulic lines 220, 222, 224, 226, 228, and 230 may be constructed from rigid line, flexible tubing, hoses or the like.

In some embodiments, the suspension system 12 further includes a first valve 232 and a second valve 234. The first valve 232 is fluidly connected with the pump 212, the hydraulic fluid accumulator 200, and the first working chamber 208. The second valve 234 is fluidly connected with the pump 212, the hydraulic fluid accumulator 200, and the second working chamber 210. As shown in FIG. 2, the first valve 232 is in line with the fifth hydraulic line 228, and when open, permits hydraulic fluid to flow from the hydraulic fluid accumulator 200 through the fifth hydraulic line 228. The second valve 234 is in line with the sixth hydraulic line 230, and when open, permits hydraulic fluid to flow from the hydraulic fluid accumulator 200 through the sixth hydraulic line 230.

The first valve 232 and the second valve 234 are the same or substantially similar to each other. In some embodiments, each of the first valve 232 and the second valve 234 are flow control valves. The first valve 232 and the second valve 234 may be electro-mechanical valves that are semi-active valves with a combination of passive spring-disk elements and a solenoid. The suspension control unit (SCU) 20 may be used to change an electrical current that is supplied to the solenoids of the first valve 232 and/or the second valve 234 to change the damping characteristics of the damper 16. Although the first valve 232 and the second valve 234 are described as solenoid operated, they may be operated by other electrical structures or using energy other than electrical energy. In some embodiments, the first valve 232 and the second valve 234 may be configured as hydraulic passive valves or semi-active hydraulic valves. As such, the first valve 232 and the second valve 234 need not be in receipt of an electrical signal if configured as passive valves.

A first pressure sensor 236 is operable to output a signal indicative of the pressure within the first hydraulic line 220. A second pressure sensor 238 is operable to output a signal indicative of the pressure within the second hydraulic line 222. As described in greater detail herein, data from the first pressure sensor 236 and the second pressure sensor 238 may be used during design and/or calibration of the suspension system 12, but data from the first pressure sensor 236 and the second pressure sensor 238 are not used during operation of the suspension system 12.

Having described the components of an exemplary embodiment of the damper 16, operation of the damper 16 is described. It should be appreciated that because the pump 212 is a bi-directional pump, the pump port that acts as an intake on the pump 212 and the pump port and that acts as an outlet on the pump 212 may be switched when the rotational direction of the pump motor 214 is reversed. For example, when the pump motor 214 is driving in a first direction and the first valve 232 is open, fluid is drawn from the hydraulic fluid accumulator 200 through the fifth hydraulic line 228 and the third hydraulic line 224 to the first pump port 216. The first pump port 216 acts as a pump intake during this portion of operation. Pressurized fluid exits the second pump port 218 acting as a pump outlet. In a different operational mode, when the pump motor 214 is driving in a second direction (opposite the first direction) and the second valve 234 is open, fluid is drawn from the hydraulic fluid accumulator 200 through the sixth hydraulic line 230 and the fourth hydraulic line 226 to the second pump port 216. The second pump port 218 acts as a pump intake during this portion of operation. Pressurized fluid exits the first pump port 216 acting as a pump outlet.

As an additional example, when the pump motor 214 is driving in a first direction and the first valve 232 and the second valve 234 are closed, fluid is drawn from the first working chamber 208 through the first hydraulic line 220 and the third hydraulic line 224 to the first pump port 216. The first pump port 216 acts as a pump intake during this portion of operation. Pressurized fluid exits the second pump port 218 acting as a pump outlet and is directed to the second working chamber 210 through the fourth hydraulic line 226 and the second hydraulic line 222. In a different operational mode, when the pump motor 214 is driving in a second direction (opposite the first direction) and the first valve 232 and the second valve 234 are closed, fluid is drawn from the second working chamber 210 through the second hydraulic line 222 and the fourth hydraulic line 226 to the second pump port 218. The second pump port 218 acts as a pump intake during this portion of operation. Pressurized fluid exits the first pump port 216 acting as a pump outlet and is directed to the first working chamber 208 through the third hydraulic line 224 and the first hydraulic line 220.

Additional details regarding the control of the suspension system 12 are now described. As shown in FIG. 2, the pump motor 214, first valve 232, and second valve 234 are operatively connected to the suspension control unit 20, which is configured to activate (i.e., turn on in forward or reverse) the pump motor 214 of the pump 212 and actuate (i.e., open and close) the first valve 232 and the second valve 234 in response to various inputs. The memory of the suspension control unit (SCU) 20 is programmed to monitor the real-time data generated by the onboard sensor(s) and determine (e.g., calculate) a target damper force or roll moment of the suspension system 12 based on the real-time data. As will also be explained in connection with the control methods described below, in one embodiment, the suspension control unit (SCU) 20 is programmed to: (i) monitor real-time data from at least one onboard sensor, the real-time data reflecting at least one of a dynamic state of the vehicle 10 and an input from a vehicle operator; (ii) calculate a damper force based on the real-time data, the damper force being a force to be output by the damper 16; (iii) determine a hydraulic torque to be output by the pump 212 based on the calculated damper force; (iv) determine a current to be applied to the pump motor 214 based on the determined hydraulic torque; and (v) cause the application of the determined current to the pump motor 214 to operate the pump motor 214 in a first direction or a second direction to cause the pump 212 to pump hydraulic fluid into and/or out of the damper 16, to apply a force to the vehicle 10 by the damper 16. In some embodiments, for example, where the vehicle 10 is equipped with four dampers 16a, 16b, 16c, 16d, the dampers 16a, 16b, 16c, 16d may apply forces to the vehicle 10 to counteract the pitch, roll, or heave of the vehicle 10. Thus the systems and methods described herein are configured to provide a roll moment to counteract the roll of the vehicle 10, a pitch moment to counteract the pitch of the vehicle 10, one or more forces to counteract the heave of the vehicle 10, or any combination of a roll moment to counteract the roll of the vehicle 10, pitch moment to counteract the pitch of the vehicle 10, and heave force to counteract the heave of the vehicle 10.

In another embodiment, the suspension control unit (SCU) 20 is programmed to: (i) monitor real-time data from at least one onboard sensor, the real-time data reflecting at least one of a dynamic state of the vehicle 10 and an input from a vehicle operator; (ii) calculate a moment compensation based on the real-time data, the moment compensation being a moment to be imparted on the vehicle 10 by a first damper 16 of one of the dampers 16a, 16b, 16c, 16d and a second damper 16 of one of the dampers 16a, 16b, 16c, 16d; (iii) determine a hydraulic torque to be output by the pump 212 fluidly connected to the first damper 16 and the second damper 16 based on the calculated moment compensation; (iv) determine a current to be applied to the pump motor 214 based on the determined hydraulic torque; and (v) cause the application of the determined current to the pump motor 214 to operate the pump motor 214 in a first direction or a second direction to cause the pump 212 to pump hydraulic fluid into and/or out of the first damper 16 and into and/or out of the second damper 16, to apply a moment to the vehicle by the first damper and the second damper. The moment may be a roll moment, a pitch moment, or a combination of a roll moment and a pitch moment.

Figure 3:
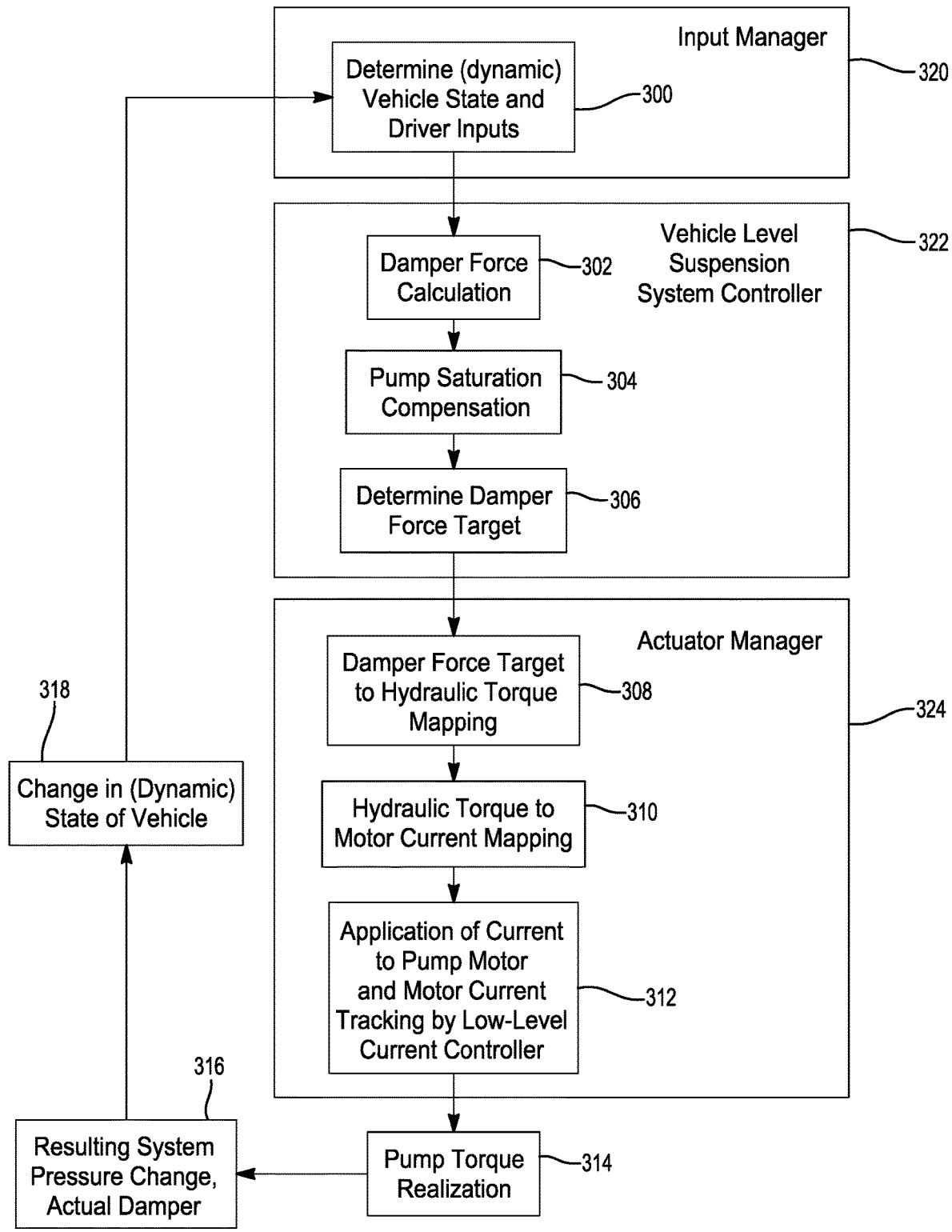
FIG. 3 is a flow diagram illustrating an exemplary method of controlling the exemplary suspension system described in the present disclosure.

With reference to FIGS. 2 and 3, a general suspension control loop for the suspension system 12 shown in FIG. 2 is described. In this embodiment, there is a pump 212 and pump motor 214 per damper 16. Again, the control loop does not rely on any inputs from pressure sensors 236 and 238 during operation of the suspension system 12.

At block 300, the suspension control unit 20 determines the dynamic state of the vehicle 10 and/or inputs from the vehicle operator. Specifically, the suspension control unit 20 monitors real-time data from at least one onboard sensor, wherein the real-time data represents at least one of the dynamic state of the vehicle 10 and/or an input from the vehicle operator. For example, the suspension control unit 20 receives inputs from one, some, or all of the steering wheel angle (SWA) sensor 30, the throttle position sensor 32, the brake position sensor 34, the vehicle speed sensor 36, the one or more wheel speed sensors 38, and the inertial measurement unit (IMU) 40. Based on these inputs, the suspension control unit 20 determines the dynamic vehicle state and/or the inputs from the vehicle operator.

At block 302, the suspension control unit 20 performs a damper force calculation. That is, the suspension control unit 20 calculates the required output forces from the dampers 16a, 16b, 16c, 16d based on the real-time data regarding the dynamic vehicle state, the vehicle operator inputs, and/or the geometrical and inertial parameters of the vehicle 10. This function calculates the force that is required to be output by each damper 16a, 16b, 16c, 16d. In embodiments where there is an independent active damper 16 per vehicle wheel (e.g., a vehicle with four wheels and four active dampers, one active damper per wheel), the suspension control unit 20 accounts for the pitch and heave degrees of freedom in the damper force calculations. For example, anti-pitch and anti-heave force targets are defined with respect to respective longitudinal and vertical loads. These anti-pitch and anti-heave force targets may be combined with anti-roll targets to determine the required damper forces for each damper 16a, 16b, 16c, 16d. The damper force calculation targets may be set during design and/or calibration of the suspension system 12, such as by a vehicle manufacturer and/or supplier, and/or may be set by an end user (e.g., a vehicle operator), depending on the implementation of the suspension system 12.

At block 304, the suspension control unit 20 utilizes a pump saturation compensation function to correct for any potential limiting factors of the suspension system 12. As every suspension system 12 has its limitations, both from peak load as well as a dynamic response point of view, such limitations should be accounted for when determining the operating setpoint that is requested from the suspension system 12. For example, if at block 302, suspension control unit 20 calculates damper forces that are unattainable due to the saturation of one or more of the pump assemblies 18a, 18b, 18c, 18d associated with the dampers 16a, 16b, 16c, 16d, the pump saturation compensation function at block 304 will limit the damper forces on the vehicle level due to the limiting pump assembly 18 and correspondingly recalculate and adjust the damper forces for the other dampers 16 to provide an equally balanced full system response matching as closely as possible with the initially intended output of block 302. Therefore, the suspension control unit 20 is configured to modify the damper forces based on the pump saturation compensation calculation.

At block 306, based on the results of the damper force calculation (from block 302) and the pump saturation compensation calculation (from block 304), the suspension control unit 20 determines damper force targets that are required to be output by the dampers 16a, 16b, 16c, 16d. Additionally, at block 306, the suspension control unit 20 may determine whether any sign changes are required in order to achieve the determined damper force targets. For example, the suspension control unit 20 may determine whether the pump motors 214 need to be run in the forward direction or the reverse direction to achieve the determined damper force targets.

As indicated above, every suspension system 12 has a limitation in dynamic response. Thus, in some embodiments, also at block 306, additional filtering is performed on the request signals to match the dynamic response capabilities of the suspension system 12, safeguarding the intended effect at the vehicle level throughout any requested change. For example, if a faster force input change is requested to one or more of the dampers 16 than one or more of the pump assemblies 18 can practically achieve, this is corrected for by the filtering action. Additionally, the damper force targets to the other dampers 16 in the suspension system 12 are adjusted accordingly in order to keep the overall response balanced. This approach accounts for any differences that may exist in dynamic response between different dampers 16 and pump assemblies 18 in the suspension system 12. The filter type and tuning are determined by the dynamics of the suspension system 12 in accordance with the desired system dynamics. In some embodiments, the filtering is accomplished by a low-pass filter. In other embodiments, filtering takes into account internal states and working points of each damper 16.

At block 308, the suspension control unit 20 maps the damper force targets to hydraulic torques (i.e., the pressure differential between the first pump port 216 and the second pump port 218 of the pump 212) required to be applied by the pumps 212 of each corresponding damper 16a, 16b, 16c, 16d to achieve the damper force targets. For example, the suspension control unit 20 utilizes a first lookup table in which hydraulic torque values are mapped to damper force targets. An exemplary first lookup table is shown in Table 1 below:

TABLE 1

First Lookup Table

| Damper Force Target | Hydraulic Torque |
|---|---|
| 1 kN | 10 bar |
| 1.5 kN | 15 bar |
| 2.0 kN | 20 bar |

At block 310, the suspension control unit 20 maps the hydraulic torques required to be applied by the pumps 212 to a current to be applied to the pump motors 214 to achieve the required hydraulic force. For example, the suspension control unit 20 utilizes a second lookup table in which motor current values are mapped to hydraulic torque values. An exemplary second lookup table is shown in Table 2 below:

TABLE 2

Second Lookup Table

| Hydraulic Torque | Motor Current |
|---|---|
| 10 bar | 10 amps |
| 15 bar | 15 amps |
| 20 bar | 20 amps |

In some embodiments, this second lookup table is created by applying a set current to the pump motor 214 for a set period of time to determine the hydraulic torque output by the pump 212. For example, a current of 10 amps is applied to the pump motor 214 for one second and the hydraulic torque output by the pump 212 is measured. Subsequent hydraulic torque measurements are taken at various current levels applied to the pump motor 214 up to the maximum current to the pump motor 214 to build out the second lookup table. The building of this second lookup table is done during design of the suspension system 12. By building this second lookup table and then utilizing this second lookup table during operation of the vehicle 10, the pressure readings from pressure sensors 236, 238 are not required. This eliminates disturbances to the control system that can arise from noise or road inputs that are inherent in or measured by the pressure sensors 236, 238.

At block 312, the suspension control unit 20 causes a current to be applied to the pump motors 214 of each corresponding damper 16a, 16b, 16c, 16d that is required to achieve the required hydraulic torques from the pumps 212 determined using the second lookup table from block 310. The suspension control unit 20 also monitors the motor current actually applied to the pump motors 214. In some embodiments, the pump motors 214 of each corresponding damper 16a, 16b, 16c, 16d include their own low-level controller (not shown). The low-level controller includes a low-level current control loop, which may come in various forms depending on the type of electric motor and corresponding motor drive used. For example, the low-level control loop may be a PID-based control system to track the desired current levels; however, more advanced control systems such as FOC-control may also be utilized in the low-level controller of the pump motor 214. The overall suspension control unit 20 is set up such that it is agnostic of the low-level controllers in the pump motors 214. The overall suspension control unit 20 is configured to accurately track the desired current setpoints, which are continuously varying in time.

At block 314, following the application of a current to the pump motors 214 of each corresponding damper 16a, 16b, 16c, 16d, the pump motors 214 turn the corresponding pumps 212 to generate the required hydraulic torques, which are then applied to the corresponding dampers 16a, 16b, 16c, 16d.

At block 316, the application of the hydraulic torques results in a pressure change in the first working chambers 208 and the second working chambers 210 of the dampers 16a, 16b, 16c, 16d, resulting in changes to the actual forces applied by the dampers 16a, 16b, 16c, 16d. Stated in another way, at blocks 312, 314, and 316, one or more currents are applied to the pump motors 214 of each corresponding damper 16a, 16b, 16c, 16d to cause the pump motors 214 to operate in one or more of the first direction and/or the second direction, which causes the pumps 212 to pump hydraulic fluid into and/or out of the first working chambers 208 and the second working chambers 210 of the dampers 16a, 16b, 16c, 16d, and which causes forces to be output by the dampers 16a, 16b, 16c, 16d.

At block 318, the resulting change to the actual forces applied by the dampers 16a, 16b, 16c, 16d to the vehicle 10 results in a change in the dynamic state of the vehicle 10. The control loop then returns to block 300.

Although the control loop of FIG. 3 is described as being conducted within suspension control unit 20 generally, it should be understood that one or more modules may be programmed into the suspension control unit 20, in which the one or more modules may perform discrete portions of the control loops described in FIG. 3. In some embodiments, the multiple modules may be software, hardware, firmware and/or any combination thereof that perform discrete portions of the control loop described in FIG. 3. As an example only, the suspension control unit 20 may comprise an input manager module 320, a vehicle level suspension system controller module 322, and an actuator manager module 324. In this example, the input manager module 320 performs blocks 300 of FIG. 3, respectively, and interfaces with the vehicle level suspension system controller module 322.

The vehicle level suspension system controller module 322 performs blocks 302, 304, 306 of FIG. 3, and interfaces with the actuator manager module 324. The actuator manager module 324 performs blocks 308, 310, 312 of FIG. 3, and interfaces with the pump assemblies 18 of the dampers 16, where the pump assemblies 18 and dampers 16 perform blocks 314, 316, 318 of FIG. 3. The actuator manager module 324 may also be referred to as a damper manager module.

Although FIG. 3 is described with respect to a single damper 16, it should be understood that the method described therein may be used with a vehicle 10 having one or more dampers 16, such as for example only and without limitation, four dampers 10. Accordingly, the method of FIG. 3 may be used to control one or more dampers 16.

Figure 4:
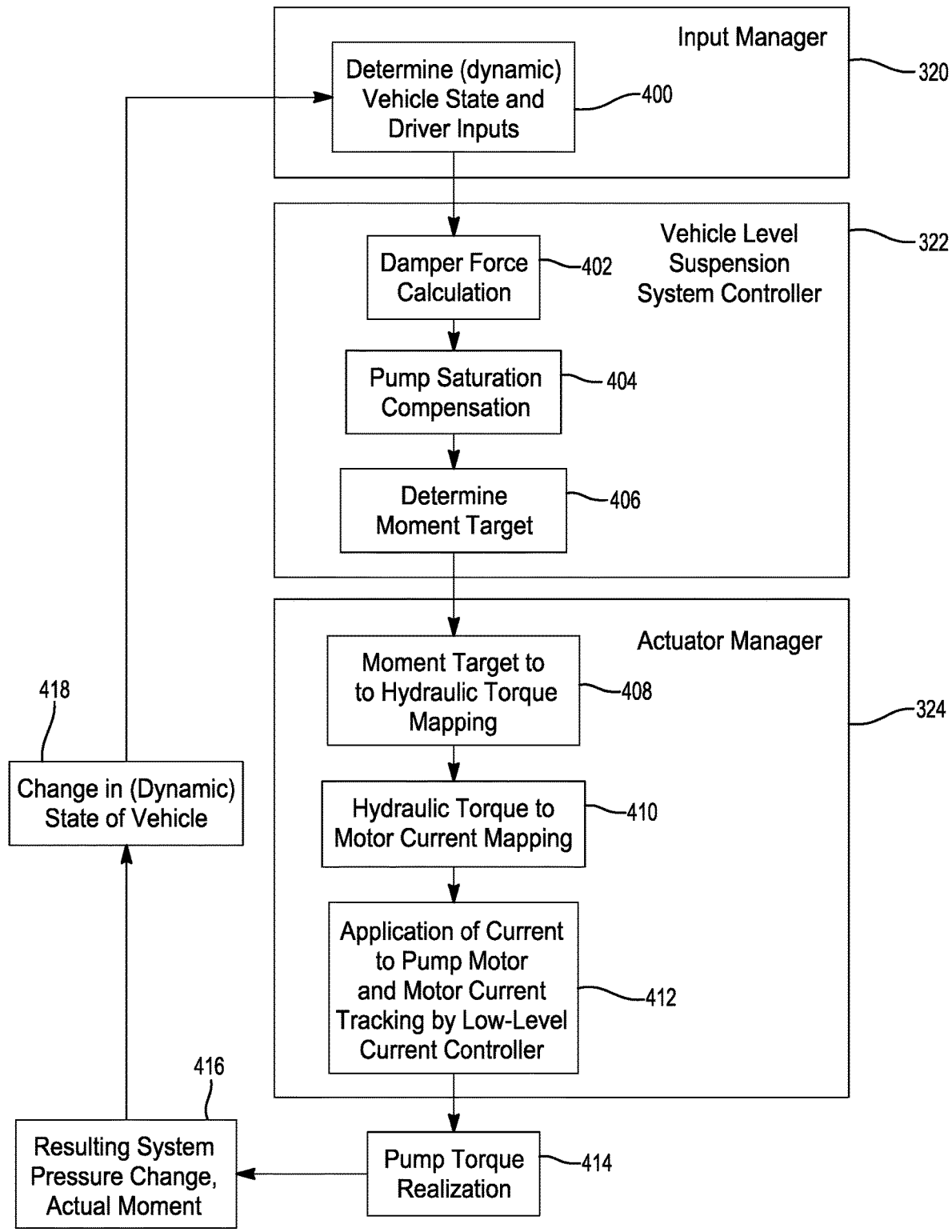
FIG. 4 is a flow diagram illustrating another exemplary method of controlling the exemplary suspension system described in the present disclosure.

Now with reference to FIG. 4, a moment compensation control loop for the suspension system 12 is described, where the moment may be a roll moment, a pitch moment, or a combination of a roll moment and a pitch moment. Again, the control loop does not rely on any inputs from pressure sensors 236 and 238 during operation of the suspension system 12.

In this example embodiment, the suspension system includes dampers 16a, 16b, 16c, 16d and two pump assemblies, a front pump assembly 18a and a back pump assembly 18c. In this embodiment, there is one pump assembly 18 per two dampers 16.

The front pump assembly 18a is fluidly connected to the front left damper 16a and the front right damper 16b and the back pump assembly 18c is fluidly connected to the back left damper 16c and the back right damper 16d. For example, the pump 212 of the front pump assembly 18a is fluidly connected to the front left damper 16a and the front right damper 16b, such that: (1) when the pump 212 operates to decrease pressure in the first working chamber 208 of the front left damper 16a, the pressure in the second working chamber 210 of the front right damper 16b is decreased, and (2) when the pump 212 operates to increase pressure in the first working chamber 208 of the front left damper 16a, the pressure in the second working chamber 210 of the front right damper 16b is increased. Stated another way, the first pump port 216 of the pump 212 of the front pump assembly 18a is fluidly connected by one or more hydraulic lines to the first working chamber 208 of the front left damper 16a and the second working chamber 210 of the front right damper 16b, and the second pump port 218 of the pump 212 of the front pump assembly 18a is fluidly connected by one or more hydraulic lines to the second working chamber 210 of the front left damper 16a and the first working chamber 208 of the front right damper 16b.

Additionally, in this example, the pump 212 of the back pump assembly 18c is fluidly connected to the back left damper 16c and the back right damper 16d, such that: (1) when the pump 212 operates to decrease pressure in the first working chamber 208 of the back left damper 16c, the pressure in the second working chamber 210 of the back right damper 16d is decreased, and (2) when the pump 212 operates to increase pressure in the first working chamber 208 of the back left damper 16c, the pressure in the second working chamber 210 of the back right damper 16d is increased. Stated another way, the first pump port 216 of the pump 212 of the rear pump assembly 18c is fluidly connected by one or more hydraulic lines to the first working chamber 208 of the back left damper 16c and the second working chamber 210 of the back right damper 16d, and the second pump port 218 of the pump 212 of the back pump assembly 18c is fluidly connected by one or more hydraulic lines to the second working chamber 210 of the back left damper 16c and the first working chamber 208 of the back right damper 16d. It should be understood that this configuration is merely exemplary and that the method shown and described with respect to FIG. 4 may be used in other configurations of suspension systems without departing from the scope of the disclosure.

At block 400, the suspension control unit 20 determines the dynamic state of the vehicle 10 and/or inputs from the vehicle operator. Specifically, the suspension control unit 20 monitors real-time data from at least one onboard sensor, wherein the real-time data represents at least one of the dynamic state of the vehicle 10 and/or an input from the vehicle operator. For example, the suspension control unit 20 receives inputs from one, some, or all of the steering wheel angle (SWA) sensor 30, the throttle position sensor 32, the brake position sensor 34, the vehicle speed sensor 3, the one or more wheel speed sensors 38, and the inertial measurement unit (IMU) 40. Based on these inputs, the suspension control unit 20 determines the dynamic vehicle state and/or the inputs from the vehicle operator.

At block 402, the suspension control unit 20 performs a moment compensation calculation. That is, the suspension control unit 20 calculates the required output forces from the front dampers 16a, 16b and the rear dampers 16c, 16d based on the real-time data regarding the dynamic vehicle state, the vehicle operator inputs, and/or the geometrical and inertial parameters of the vehicle 10 to counteract the roll, pitch, or roll and pitch of the vehicle 10. This function calculates the moment that is required to be output by the front dampers 16a, 16b and the rear dampers 16c, 16d, wherein the moment may be a roll moment, a pitch moment, or a combination of a roll moment and a pitch moment. The moment compensation calculation accounts for the amount of resulting roll angle, pitch angle, or roll and pitch angle for a certain lateral load and/or longitudinal load that is required, as well as the division of the resulting forces over all four wheels 14. The moment compensation calculation targets may be set during design and/or calibration of the suspension system 12, such as by a vehicle manufacturer and/or supplier, and/or may be set by an end user (e.g., a vehicle operator), depending on the implementation of the suspension system 12.

At block 404, the suspension control unit 20 utilizes a pump saturation compensation function to correct for any potential limiting factors of the suspension system 12. As every suspension system 12 has its limitations, both from peak load as well as a dynamic response point of view, such limitations should be accounted for when determining the operating setpoint that is requested from the suspension system 12. For example, if at block 402, suspension control unit 20 calculates damper forces that are unattainable due to the saturation of one or more of the pump assemblies 18a, 18b, 18c, 18d associated with the dampers 16a, 16b, 16c, 16d, the pump saturation compensation function at block 404 will limit the damper forces on the vehicle level due to the limiting pump assembly 18 and correspondingly recalculate and adjust the damper forces for the other dampers 16 to provide an equally balanced full system response matching as closely as possible with the initially intended output of block 402. Therefore, the suspension control unit 20 is configured to modify the damper forces, and thus the moment compensation, based on the pump saturation compensation calculation.

At block 406, based on the results of the moment compensation calculation (from block 402) and the pump saturation compensation calculation (from block 404), the suspension control unit 20 determines the moment targets (e.g., the roll moment targets, the pitch moment targets, or the combined roll and pitch moment targets) that are required to be output by the front dampers 16a, 16b and the back dampers 16c, 16d. Additionally, at block 406, the suspension control unit 20 may determine whether any sign changes are required in order to achieve the determined moment targets. For example, the suspension control unit 20 may determine whether the pump motors 214 need to be run in the forward direction or the reverse direction to achieve the determined moment targets.

As indicated above, every suspension system 12 has a limitation in dynamic response. Thus, in some embodiments, also at block 406, additional filtering is performed on the request signals to match the dynamic response capabilities of the suspension system 12, safeguarding the intended effect at the vehicle level throughout any requested change. For example, if a faster moment input change is requested to one or more of the front dampers 16a, 16b and back dampers 16c, 16d than one or more of the pump assemblies 18 of the front dampers 16a, 16b and back dampers 16c, 16d can practically achieve, this is corrected for by the filtering action. Additionally, the moment targets to the other dampers 16 in the suspension system 12 are adjusted accordingly in order to keep the overall response balanced. This approach accounts for any differences that may exist in dynamic response between different dampers 16 and pump assemblies 18 in the suspension system 12. The filter type and tuning are determined by the dynamics of the suspension system 12 in accordance with the desired system dynamics. In some embodiments, the filtering is accomplished by a low-pass filter. In other embodiments, filtering takes into account internal states and working points of each damper 16.

At block 408, the suspension control unit 20 maps the moment targets to hydraulic torques (i.e., the pressure differential between the first pump port 216 and the second pump port 218 of the pump 212) required to be applied by the pumps 212 of each corresponding front pump assembly 18a and back pump assembly 18c to achieve the moment targets for the front dampers 16a, 16b and the back dampers 16c, 16d, respectively. For example, the suspension control unit 20 utilizes a first lookup table in which hydraulic torque values are mapped to moment targets. An exemplary first lookup table is shown in Table 3 below:

TABLE 3

| First Lookup Table | |
|---|---|
| Moment Target | Hydraulic Torque |
| 1 kNm | 10 bar |
| 1.5 kNm | 15 bar |
| 2.0 kNm | 20 bar |

At block 410, the suspension control unit 20 maps the hydraulic torques required to be applied by the pumps 212 of each corresponding front pump assembly 18a and back pump assembly 18c to a current to be applied to the pump motors 214 of each corresponding front pump assembly 18a and back pump assembly 18c to achieve the required hydraulic torque. For example, the suspension control unit 20 utilizes a second lookup table in which motor current values are mapped to hydraulic torque values. An exemplary second lookup table is shown in Table 2 below:

TABLE 2

Second Lookup Table

| Hydraulic Torque | Motor Current |
|---|---|
| 10 bar | 10 amps |
| 15 bar | 15 amps |
| 20 bar | 20 amps |

In some embodiments, this second lookup table is created by applying a set current to the pump motor 214 for a set period of time to determine the hydraulic torque output by the pump 212. For example, a current of 10 amps is applied to the pump motor 214 for one second and the hydraulic torque output by the pump 212 is measured. Subsequent hydraulic torque measurements are taken at various current levels applied to the pump motor 214 up to the maximum current to the pump motor 214 to build out the second lookup table. The building of this second lookup table is done during design of the suspension system 12. By building this second lookup table and then utilizing this second lookup table during operation of the vehicle 10, the pressure readings from pressure sensors 236, 238 are not required. This eliminates disturbances to the control system that can arise from noise or road inputs that are inherent in or measured by the pressure sensors 236, 238.

At block 412, the suspension control unit 20 causes a current to be applied to the pump motors 214 of each corresponding front pump assembly 18a and back pump assembly 18c for the front dampers 16a, 16b and the back dampers 16c, 16d, respectively, that is required to achieve the required hydraulic torques from the pumps 212 determined using the second lookup table from block 410. The suspension control unit 20 also monitors the motor current actually applied to the pump motors 214. In some embodiments, the pump motors 214 of each corresponding front pump assembly 18a and back pump assembly 18c include their own low-level controller (not shown). The low-level controller includes a low-level current control loop, which may come in various forms depending on the type of electric motor and corresponding motor drive used. For example, the low-level control loop may be a PID-based control system to track the desired current levels; however, more advanced control systems such as FOC-control may also be utilized in the low-level controller of the pump motor 214. The overall suspension control unit 20 is set up such that it is agnostic of the low-level controllers in the pump motors 214. The overall suspension control unit 20 is configured to accurately track the desired current setpoints, which are continuously varying in time.

At block 414, following the application of a current to the pump motors 214 of each corresponding front pump assembly 18a and back pump assembly 18c for the front dampers 16a, 16b and the back dampers 16c, 16d, respectively, the pump motors 214 turn the corresponding pumps 212 to generate the required hydraulic torques, which are then applied to the corresponding front dampers 16a, 16b and back dampers 16c, 16d.

At block 416, the application of the hydraulic torques results in a pressure change in the first working chambers 208 and the second working chambers 210 of the dampers 16a, 16b, 16c, 16d, resulting in changes to the actual moments (e.g., roll moments, pitch moments, or combined pitch and roll moments) applied by the dampers 16a, 16b, 16c, 16d. Stated in another way, at blocks 412, 414, and 416, one or more currents are applied to the pump motors 214 of each corresponding front pump assembly 18a and back pump assembly 18c for the front dampers 16a, 16b and the back dampers 16c, 16d, respectively, to cause the pump motors 214 to operate in one or more of the first direction and/or the second direction, which causes the pumps 212 to pump hydraulic fluid into and/or out of the first working chambers 208 and the second working chambers 210 of the dampers 16a, 16b, 16c, 16d, and which causes forces to be output by the dampers 16a, 16b, 16c, 16d.

At block 418, the resulting change to the actual moment applied by the dampers 16a, 16b, 16c, 16d to the vehicle 10 results in a change in the dynamic state of the vehicle 10. The control loop then returns to block 400.

Although the control loop of FIG. 4 is described as being conducted within suspension control unit 20 generally, it should be understood that one or more modules may be programmed into the suspension control unit 20, in which the one or more modules may perform discrete portions of the control loops described in FIG. 4. In some embodiments, the multiple modules may be software, hardware, firmware and/or any combination thereof that perform discrete portions of the control loop described in FIG. 4. As an example only, the suspension control unit 20 may comprise the input manager module 320, the vehicle level suspension system controller module 322, and the actuator manager module 324. In this example, the input manager module 320 performs block 400 of FIG. 4, and interfaces with the vehicle level suspension system controller module 322. The vehicle level suspension system controller module 322 performs blocks 402, 404, 406 of FIG. 4, and interfaces with the actuator manager module 324. The actuator manager module 324 performs blocks 408, 410, 412 of FIG. 4, and interfaces with the pump assemblies 18 of the dampers 16, where the pump assemblies 18 and dampers 16 perform blocks 414, 416, 418 of FIG. 4. The actuator manager module 324 may also be referred to as a damper manager module.

Figure 5:
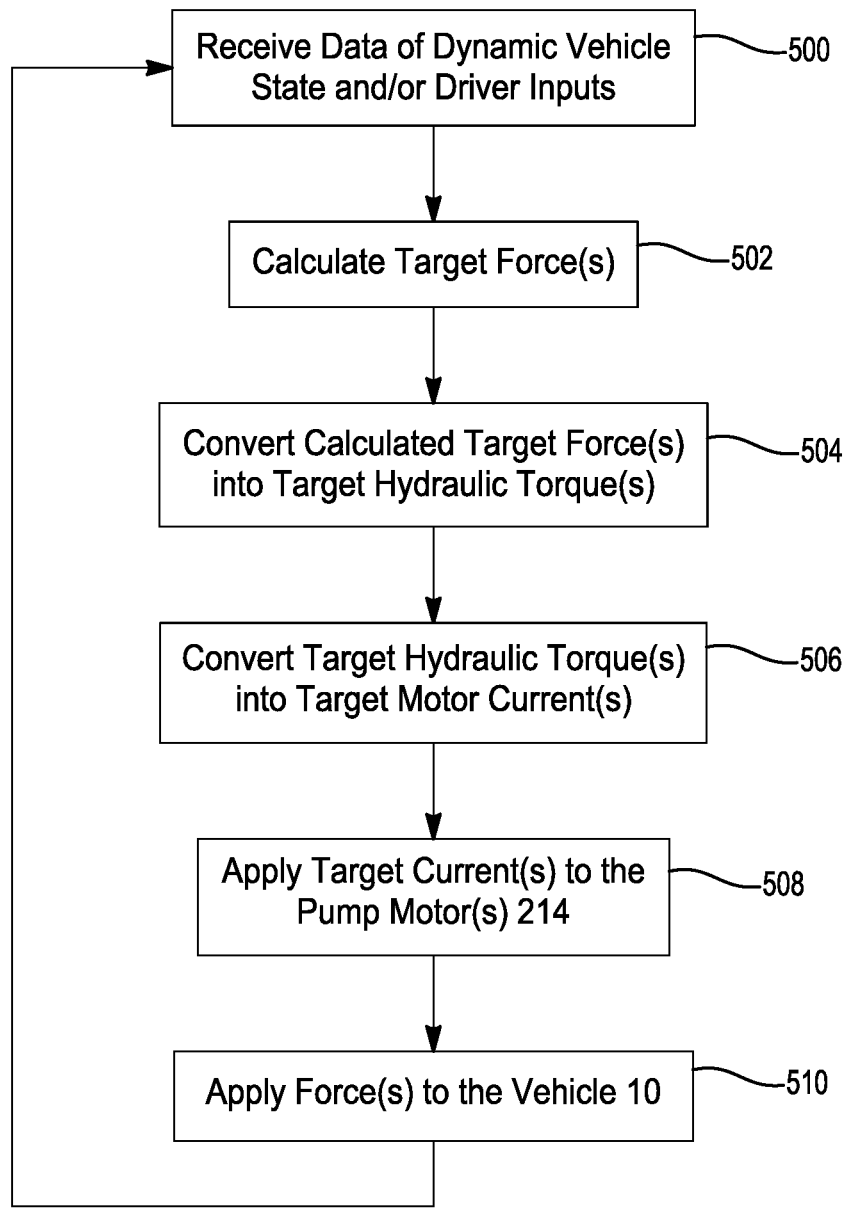
FIG. 5 is a flow diagram illustrating an exemplary method of controlling the exemplary suspension system described in the present disclosure.

Now with reference to FIG. 5, an alternative control loop for the suspension system 12 is described. Again, the control loop does not rely on any inputs from pressure sensors 236 and 238.

At block 500, the suspension control unit 20 receives real-time data of the dynamic vehicle state and/or vehicle operator inputs from one, some, or all of the steering wheel angle (SWA) sensor 30, the throttle position sensor 32, the brake position sensor 34, the vehicle speed sensor 3, the one or more wheel speed sensors 38, and the inertial measurement unit (IMU) 40.

At block 502, the suspension control unit 20 calculates one or more target force(s) needed to be input into the suspension system 12 by one or more of the dampers 16a, 16b, 16c, 16d to achieve the desired effect on the vehicle dynamic state based on the inputs received by the suspension control unit 20 from one, some, or all of the steering wheel angle (SWA) sensor 30, the throttle position sensor 32, the brake position sensor 34, the vehicle speed sensor 36, the one or more wheel speed sensors 38, and the inertial measurement unit (IMU) 40. In some embodiments, the target force(s) are roll moment(s) to be provided by dampers on opposite sides of the vehicle 10, such as for example, the front left damper 16a, and the front right damper 16b, or the back left damper 16c and the back right damper 16d. In some embodiments, the target force(s) are roll moment(s) to be provided by dampers on opposite sides of the vehicle, such as for example, the front left damper 16a and the back right damper 16d, or the front right damper 16b and the back left damper 16c. In some embodiments, the target force(s) are individual force(s) to be input into the suspension system 12 by dampers 16a, 16b, 16c, 16d.

At block 504, the suspension control unit 20 converts the one or more target force(s) into one or more hydraulic torque(s) (i.e., the pressure differential between the first pump port 216 and the second pump port 218 of the pump 212) required to be applied by the pumps 212 of each corresponding damper 16a, 16b, 16c, 16d to achieve the one or more target force(s). For example, the suspension control unit 20 utilizes a first pre-calculated mapping of hydraulic torque values to target forces to convert the target force(s) into the hydraulic torque(s). The first pre-calculated mapping may be a first lookup table of target force(s) to hydraulic torque(s).

At block 506, the suspension control unit 20 converts the one or more hydraulic torque(s) required to be applied by the pumps 212 of each corresponding damper 16a, 16b, 16c, 16d to a current to be applied by the pump motors 214 of each corresponding damper 16a, 16b, 16c, 16d to achieve the required hydraulic torque(s). For example, the suspension control unit 20 utilizes a second pre-calculated mapping of hydraulic torque values to motor current to convert the hydraulic torque(s) into motor current. The second pre-calculated mapping may be a second lookup table of hydraulic torque(s) to motor current(s).

At block 508, the suspension control unit 20 causes the one or more current(s) to be applied the pump motors 214 of each corresponding damper 16a, 16b, 16c, 16d that are required achieve the required hydraulic torque(s) from the pumps 212 determined at block 506.

At block 510, as a result of the application of the one or more current(s) to the pump motors 214 at block 508, the one or more dampers 16a, 16b, 16c, 16d apply one or more force(s) to the vehicle 10 to affect the vehicle dynamic state. Specifically, following the application of currents to the pump motors 214 of each corresponding damper 16a, 16b, 16c, 16d, the pump motors 214 turn the corresponding pumps 212 to generate the required hydraulic torques, which are then applied to the corresponding dampers 16a, 16b, 16c, 16d. The application of the hydraulic torques results in a pressure change in the first working chambers 208 and the second working chambers 210 of the dampers 16a, 16b, 16c, 16d, resulting in changes to the actual forces applied by the dampers 16a, 16b, 16c, 16d. The resulting change to the actual forces applied by the dampers 16a, 16b, 16c, 16d results in a change in the dynamic state of the vehicle 10. The control loop then returns to block 500.

Although the control loops of FIGS. 3, 4, and 5 are described as utilizing first and second lookup tables, it should be understood that in some embodiments, the first and second lookup tables may be combined into a single lookup table. For example, the first and second lookup tables of FIGS. 3, 4, and 5 may be combined into a single lookup table that maps a damper force target to motor current as shown in Table 5 below:

TABLE 5

Lookup Table

| Damper Force Target | Motor Current |
|---|---|
| 1 kN | 10 amps |
| 1.5 kN | 15 amps |
| 2.0 kN | 20 amps |

The foregoing description is merely illustrative in nature and is in no way intended to limit the disclosure, its application, or uses. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. Thus, the broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In the present disclosure, including in the definitions below, the term "module" or the "controller" may be replaced with the term "circuit." The term "module" may refer to, be part of, or include: an Application term Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of controlling a suspension system of a vehicle, the suspension system comprising a damper and a pump assembly fluidly connected with the damper, the pump assembly having a pump and a pump motor, the method comprising:
   monitoring real-time data from at least one onboard sensor, the real-time data reflecting at least one of a dynamic state of the vehicle and an input from a vehicle operator;
   calculating a damper force based on the real-time data, the damper force being a force to be output by the damper;
   limiting the calculated damper force in response to a determination that the calculated damper force exceeds the force able to be provided by the pump assembly;
   determining a hydraulic torque to be output by the pump based on the calculated damper force;
   determining a current to be applied to the pump motor based on the determined hydraulic torque;
   applying the determined current to the pump motor to operate the pump motor in a first direction or a second direction to cause the pump to pump hydraulic fluid into and/or out of the damper; and
   applying a force to the vehicle by the damper.

2. The method of claim 1, wherein the step of determining the hydraulic torque to be output by the pump includes mapping the damper force to the hydraulic torque using a first lookup table.

3. The method of claim 1, further comprising controlling the applied current to the pump motor.

4. The method of claim 1, further comprising determining whether to operate the pump in the first direction or the second direction.

5. The method of claim 1, wherein the at least one onboard sensor does not include a pressure sensor.

6. A method of controlling a suspension system of a vehicle, the suspension system comprising a damper and a pump assembly fluidly connected with the damper, the pump assembly having a pump and a pump motor, the method comprising:
   monitoring real-time data from at least one onboard sensor, the real-time data reflecting at least one of a dynamic state of the vehicle and an input from a vehicle operator;
   calculating a damper force based on the real-time data, the damper force being a force to be output by the damper;
   determining a hydraulic torque to be output by the pump based on the calculated damper force, wherein determining the hydraulic torque to be output by the pump includes mapping the damper force to the hydraulic torque using a first lookup table;
   determining a current to be applied to the pump motor based on the determined hydraulic torque, wherein determining the current to be applied to the pump motor includes mapping the hydraulic torque to the current using a second lookup table;
   applying the determined current to the pump motor to operate the pump motor in a first direction or a second direction to cause the pump to pump hydraulic fluid into and/or out of the damper; and
   applying a force to the vehicle by the damper.

7. A method of controlling a suspension system of a vehicle, the suspension system comprising a first damper, a second damper, and a pump assembly fluidly connected with the first damper and the second damper, the pump assembly having a pump and a pump motor, the method comprising:
   monitoring real-time data from at least one onboard sensor, the real-time data reflecting at least one of a dynamic state of the vehicle and an input from a vehicle operator;

calculating a moment compensation based on the real-time data, the moment compensation being a moment to be imparted on the vehicle by the first damper and the second damper;
determining a hydraulic torque to be output by the pump based on the calculated moment compensation, wherein determining the hydraulic torque to be output by the pump includes mapping the moment compensation to the hydraulic torque using a first lookup table;
determining a current to be applied to the pump motor based on the determined hydraulic torque, wherein determining the current to be applied to the pump motor includes mapping the hydraulic torque to the current using a second lookup table;
applying the determined current to the pump motor to operate the pump motor in a first direction or a second direction to cause the pump to pump hydraulic fluid into and/or out of the first damper and into and/or out of the second damper; and
applying a moment to the vehicle by the first damper and the second damper.

8. The method of claim 7, wherein the moment compensation is a roll moment compensation and the moment is a roll moment.

9. The method of claim 7, wherein the moment compensation is a pitch moment compensation and the moment is a pitch moment.

10. The method of claim 7, wherein the moment compensation is a combination of a roll moment compensation and a pitch moment compensation and the moment is a combination of a roll moment and a pitch moment.

11. The method of claim 7, wherein the onboard sensor does not include a pressure sensor.

12. A suspension system of a vehicle, comprising:
a damper;
a pump assembly fluidly connected with the damper, the pump assembly having a pump and a pump motor;
at least one onboard sensor configured to generate real-time data regarding the vehicle; and
a suspension control unit operatively connected to the pump motor and the at least one onboard sensor;
the suspension control unit including a processor and memory configured to monitor the real-time data generated by the at least one onboard sensor; and
the suspension control unit programmed to:
monitor real-time data from the least one onboard sensor, the real-time data reflecting at least one of a dynamic state of the vehicle and an input from a vehicle operator;
calculate a damper force based on the real-time data, the damper force being a force to be output by the damper;
limiting the calculated damper force in response to a determination that the calculated damper force exceeds the force able to be provided by the pump assembly;
determine a hydraulic torque to be output by the pump based on the calculated damper force;
determine a current to be applied to the pump motor based on the determined hydraulic torque; and
cause the application of the determined current to the pump motor to operate the pump motor in a first direction or a second direction to cause the pump to pump hydraulic fluid into and/or out of the damper, to apply a force to the vehicle by the damper.

13. The suspension system of claim 12, wherein the suspension control unit is programmed to determine the hydraulic torque to be output by the pump by mapping the damper force to the hydraulic torque using a first lookup table.

14. The suspension system of claim 12, wherein the suspension control unit is programmed to determine the current to be applied to the pump motor by mapping the hydraulic torque to the current using a second lookup table.

15. The suspension system of claim 12, wherein the suspension control unit is programmed to determine whether to operate the pump in the first direction or the second direction.

16. The suspension system of claim 12, wherein the onboard sensor does not include a pressure sensor.

* * * * *